US011978951B2

(12) United States Patent
Kim et al.

(10) Patent No.: US 11,978,951 B2
(45) Date of Patent: May 7, 2024

(54) AUTOMOTIVE ARRAY ANTENNA

(71) Applicant: LG INNOTEK CO., LTD., Seoul (KR)

(72) Inventors: Young Hwan Kim, Seoul (KR); Sae Won Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 320 days.

(21) Appl. No.: 17/419,539

(22) PCT Filed: Jan. 3, 2020

(86) PCT No.: PCT/KR2020/000079
§ 371 (c)(1),
(2) Date: Jun. 29, 2021

(87) PCT Pub. No.: WO2020/141918
PCT Pub. Date: Jul. 9, 2020

(65) Prior Publication Data

US 2022/0077575 A1 Mar. 10, 2022

(30) Foreign Application Priority Data

Jan. 3, 2019 (KR) ........................ 10-2019-0000573
Jan. 3, 2019 (KR) ........................ 10-2019-0000679

(51) Int. Cl.
*H01Q 1/38* (2006.01)
*H01Q 1/32* (2006.01)
(Continued)

(52) U.S. Cl.
CPC ................. *H01Q 1/38* (2013.01); *H01Q 1/32* (2013.01); *H01Q 1/3241* (2013.01); *H01Q 1/50* (2013.01); *H01Q 7/00* (2013.01)

(58) Field of Classification Search
CPC .. H01Q 1/38; H01Q 1/32; H01Q 1/50; H01Q 1/3241; H01Q 7/00
(Continued)

(56) References Cited

U.S. PATENT DOCUMENTS 6,359,596 B1 3/2002 Claiborne
10,784,588 B2 * 9/2020 Svensson ................. H01Q 1/22
(Continued)

FOREIGN PATENT DOCUMENTS

CN 103339855 A 10/2013
EP 2 833 479 A1 2/2015
(Continued)

OTHER PUBLICATIONS

Extended European Search Report for European Application No. 20735856.5, dated Sep. 5, 2022.

*Primary Examiner* — Khai M Nguyen
(74) *Attorney, Agent, or Firm* — Birch, Stewart, Kolasch & Birch, LLP

(57) ABSTRACT

Disclosed is an automotive array antenna according to an embodiment. The automotive array antenna includes: a first substrate; a plurality of second substrates vertically arranged on one surface of the first substrate and spaced apart at predetermined intervals; and loop antennas formed on surfaces on one side, respectively, of the plurality of second substrates, wherein the surfaces on one side, respectively, of the plurality of second substrates are arranged in the same direction.

13 Claims, 14 Drawing Sheets

(51) Int. Cl.
*H01Q 1/50* (2006.01)
*H01Q 7/00* (2006.01)

(58) Field of Classification Search
USPC .......................................................... 343/702
See application file for complete search history.

(56) References Cited

U.S. PATENT DOCUMENTS

| | | | | |
|---|---|---|---|---|
| 2006/0114159 | A1* | 6/2006 | Yoshikawa | H01Q 7/00 343/866 |
| 2006/0232492 | A1 | 10/2006 | Sawatani | |
| 2011/0195661 | A1 | 8/2011 | Miyashita | |
| 2013/0307742 | A1 | 11/2013 | Hu et al. | |

FOREIGN PATENT DOCUMENTS

| | | | |
|---|---|---|---|
| JP | 2010-81268 | A | 4/2010 |
| JP | 2012-116576 | A | 6/2012 |
| JP | 2016-119551 | A | 6/2016 |
| KR | 10-2005-0098880 | A | 10/2005 |
| KR | 10-2013-0112518 | A | 10/2013 |
| KR | 10-2013-0122761 | A | 11/2013 |
| KR | 10-2013-0134793 | A | 12/2013 |
| WO | WO 2008/016138 | A1 | 2/2008 |
| WO | WO 2015/107983 | A1 | 7/2015 |
| WO | WO 2015/160464 | A1 | 10/2015 |

* cited by examiner

【FIG. 1a】
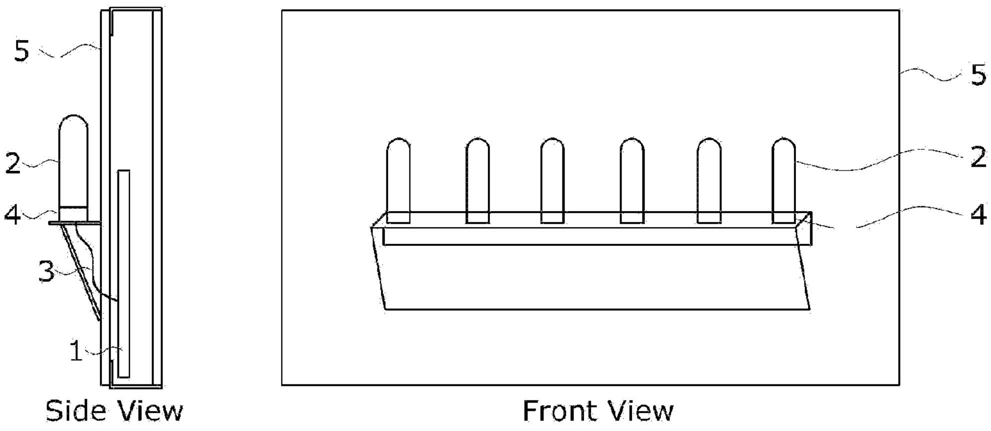
【FIG. 1b】
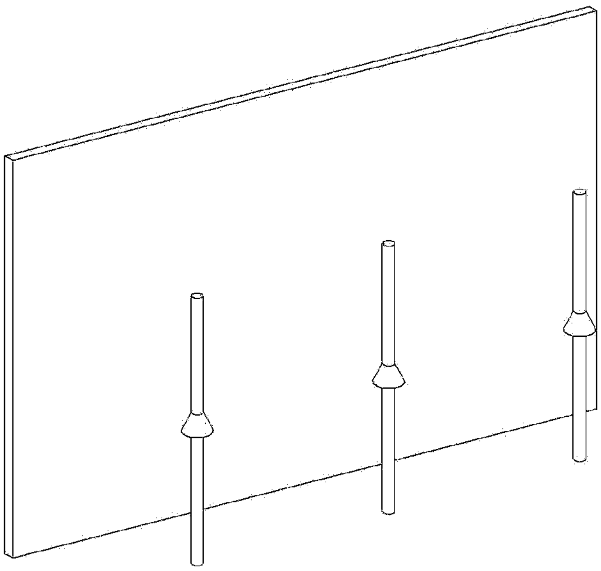

【FIG. 1c】
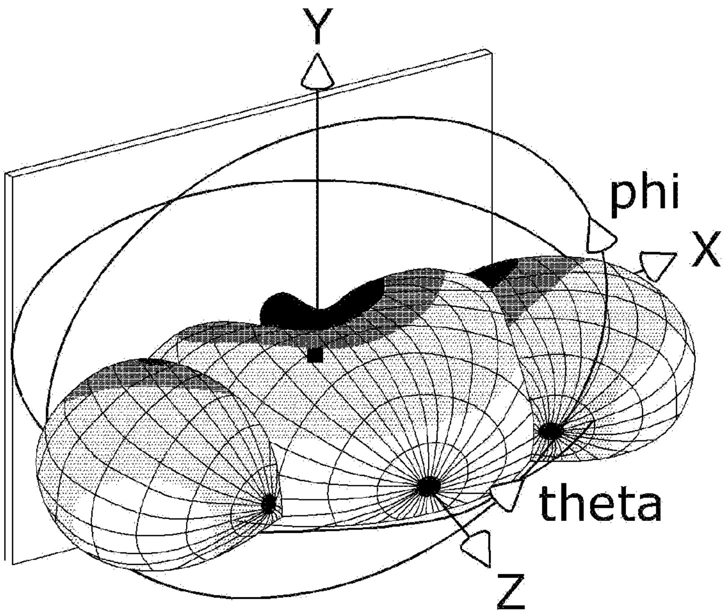
【FIG. 2】
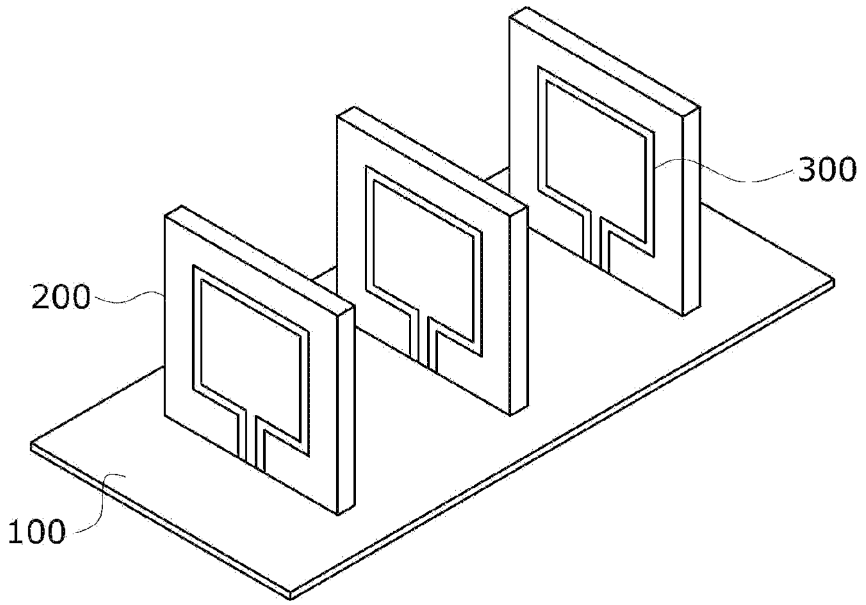

【FIG. 3a】
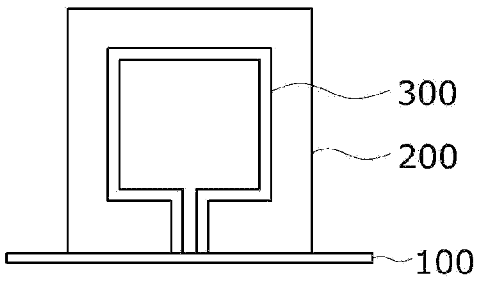
【FIG. 3b】
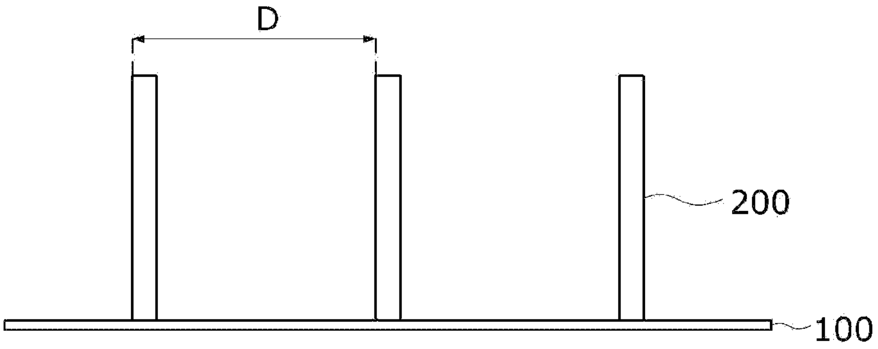
【FIG. 3c】
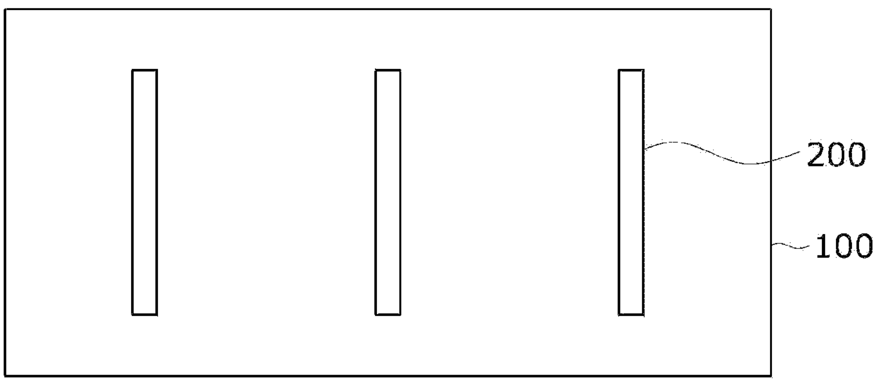

【FIG. 3d】
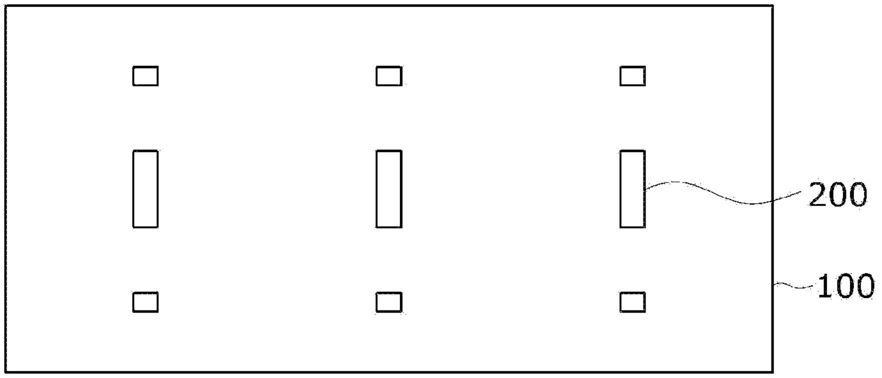
【FIG. 4a】
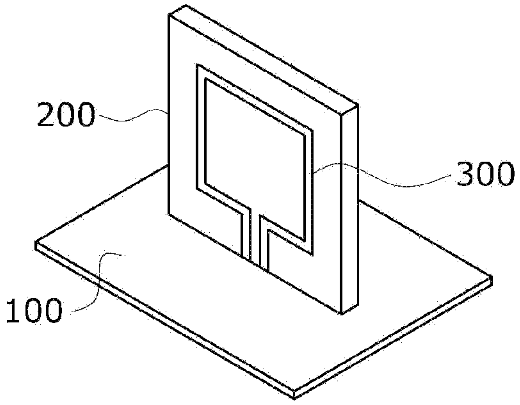

【FIG. 4b】
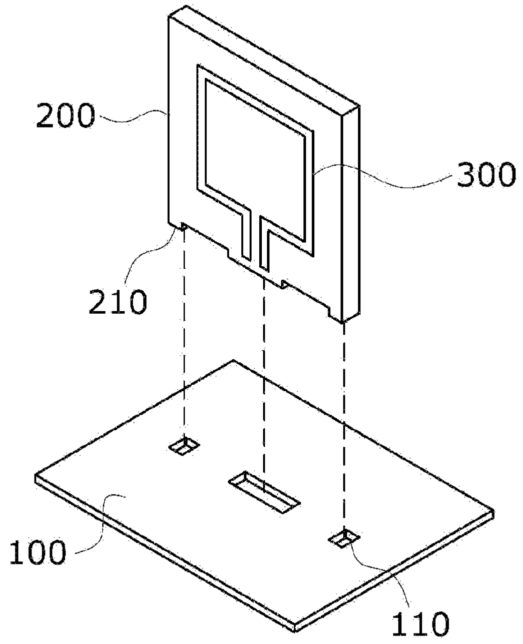
【FIG. 5a】
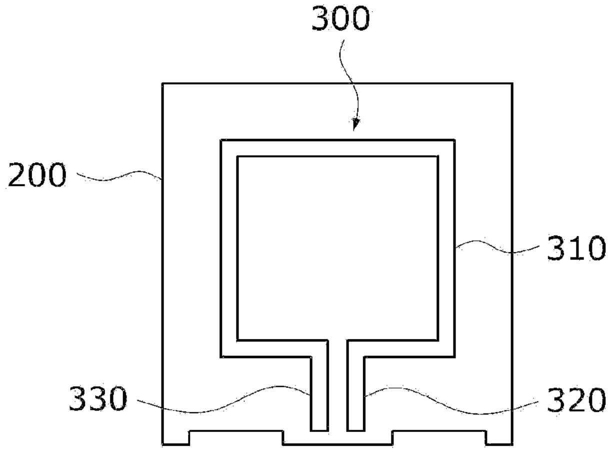

【FIG. 5b】
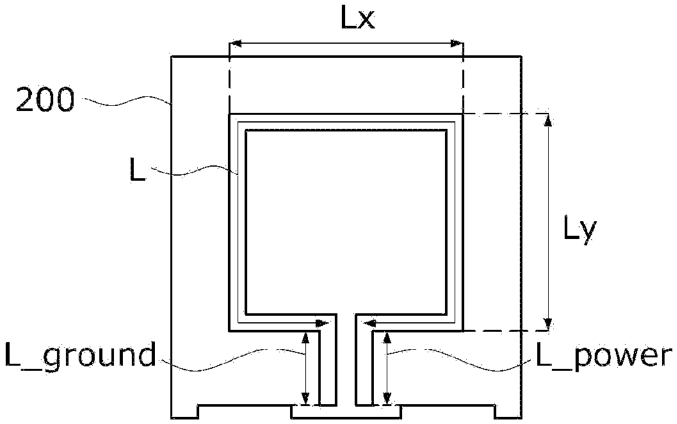
【FIG. 6a】
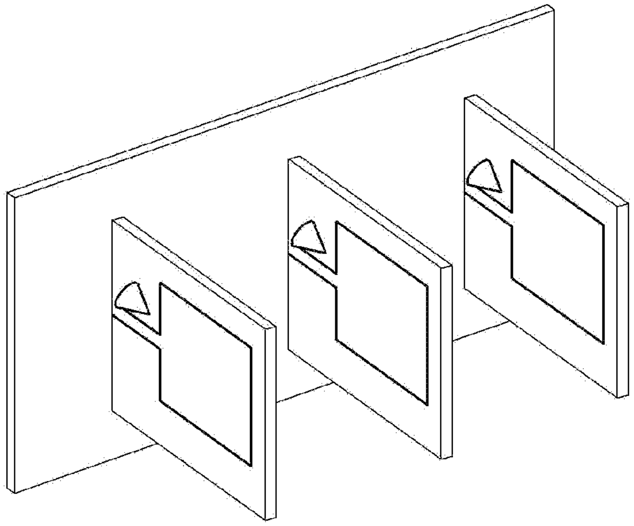

【FIG. 6b】
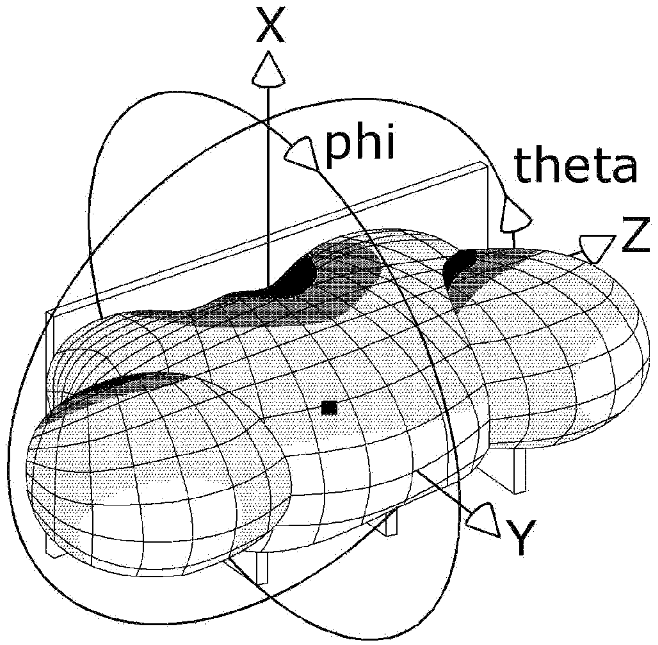
【FIG. 7】
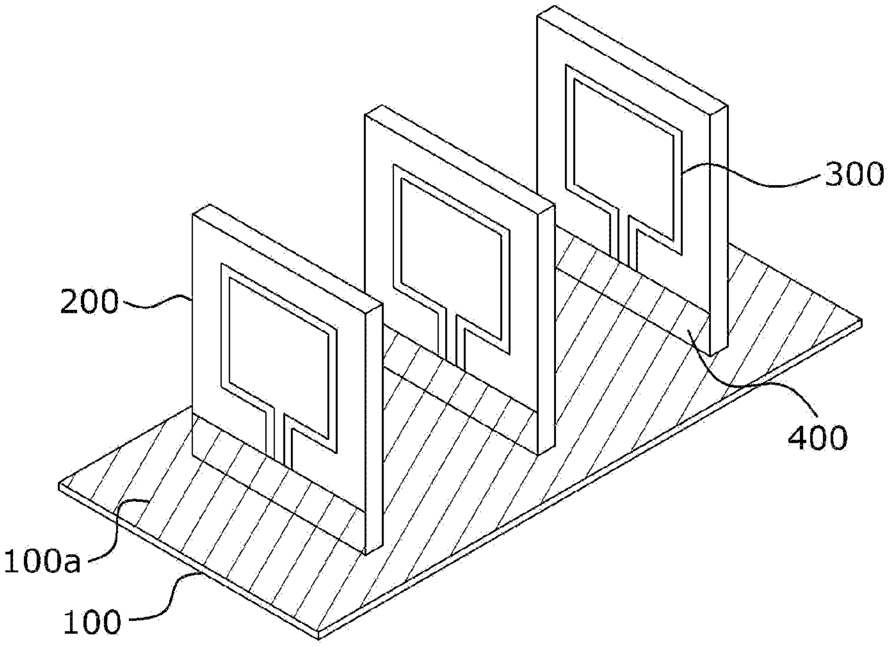

【FIG. 8a】
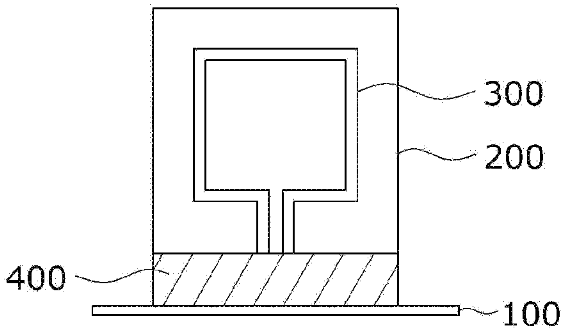
【FIG. 8b】
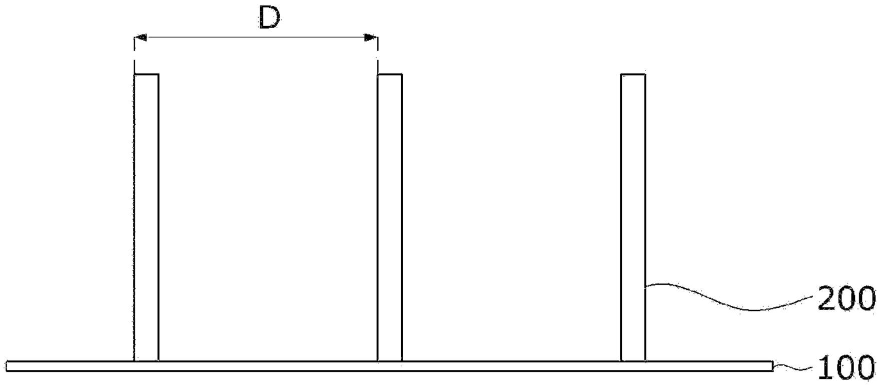
【FIG. 8c】
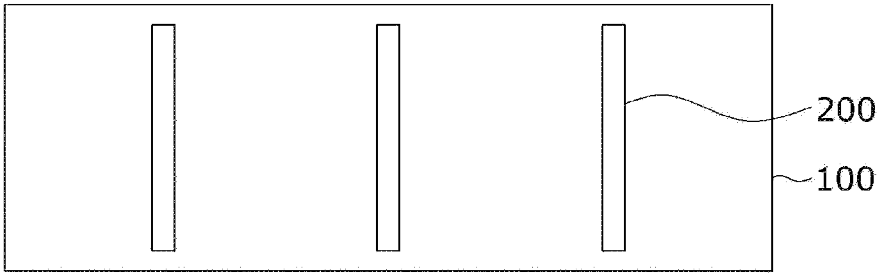

【FIG. 8d】
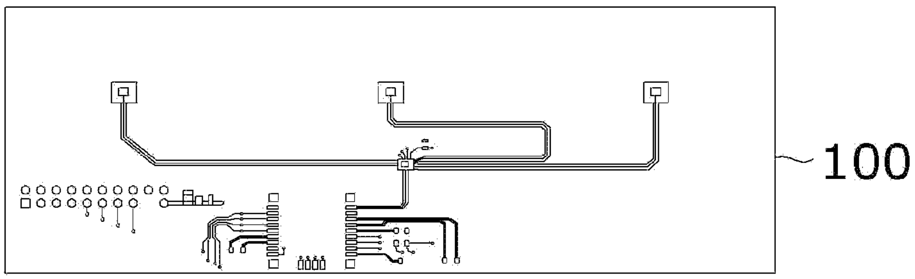
【FIG. 9a】
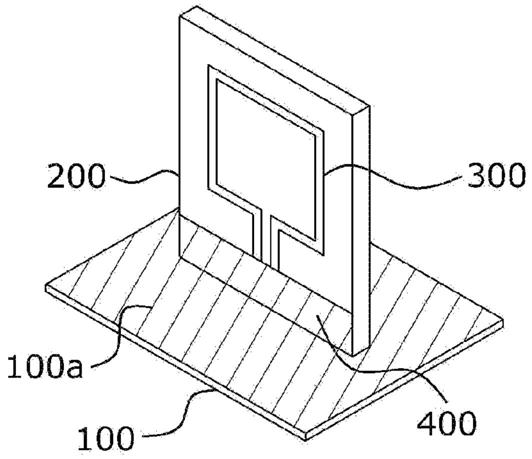

【FIG. 9b】
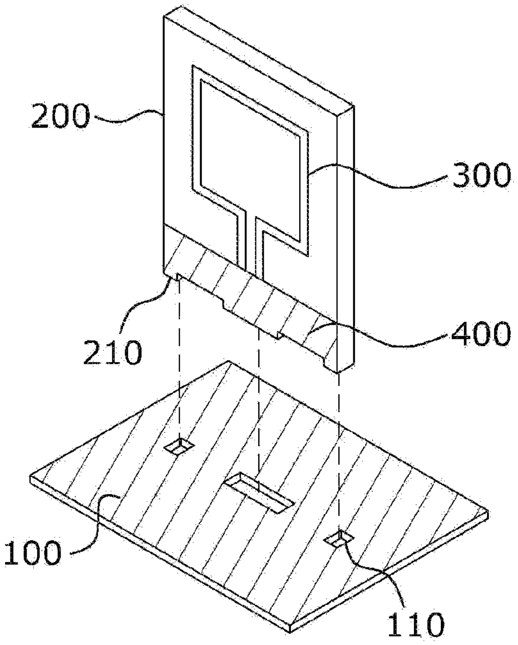
【FIG. 10a】
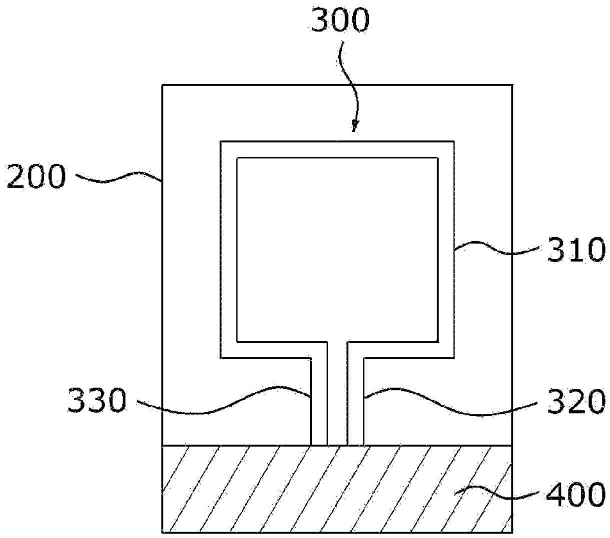

【FIG. 10b】
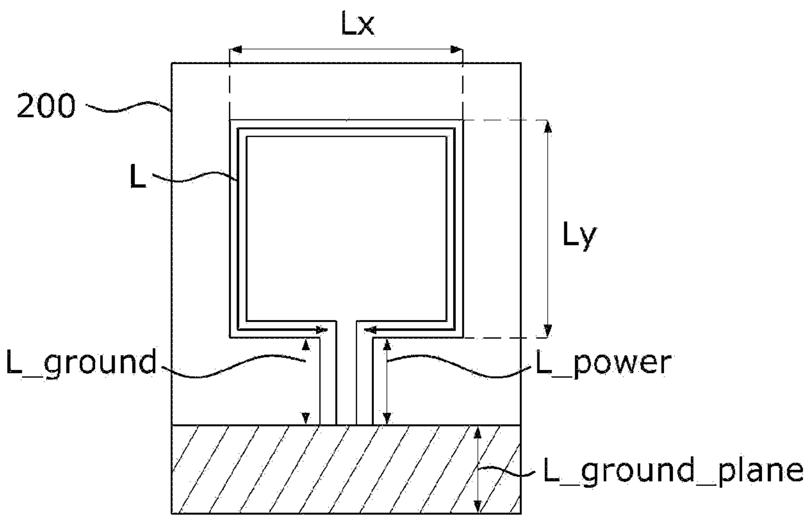
【FIG. 11a】
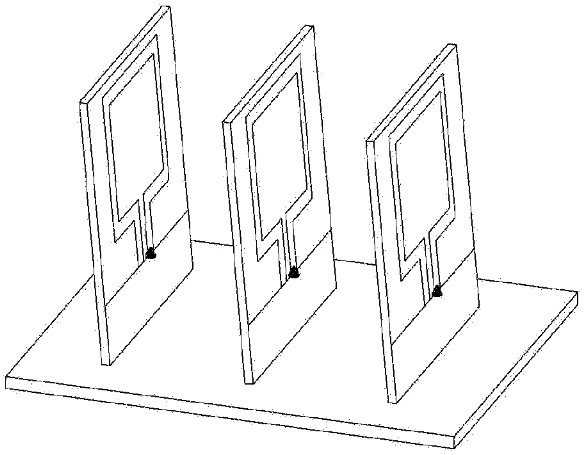

【FIG. 11b】
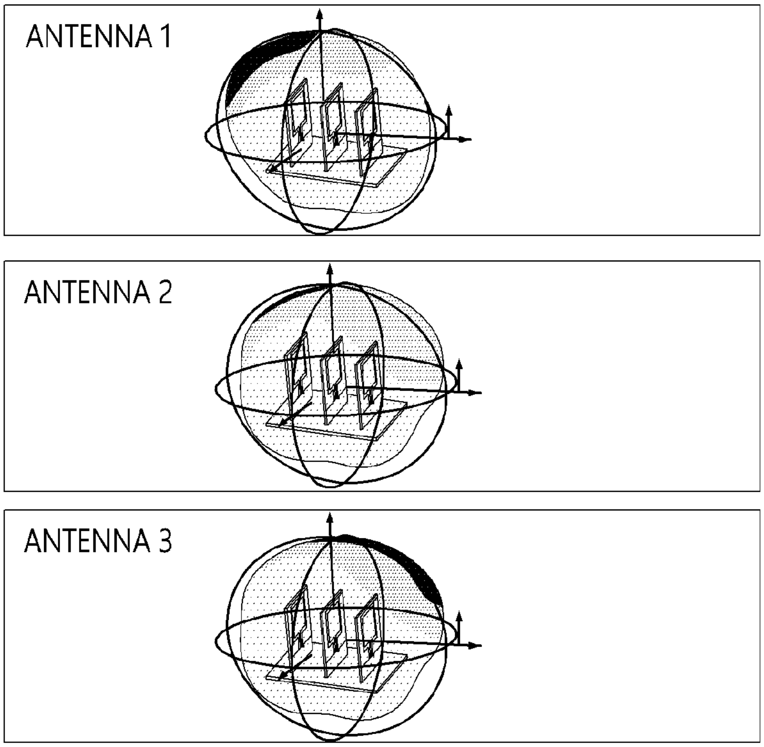

【FIG. 12a】
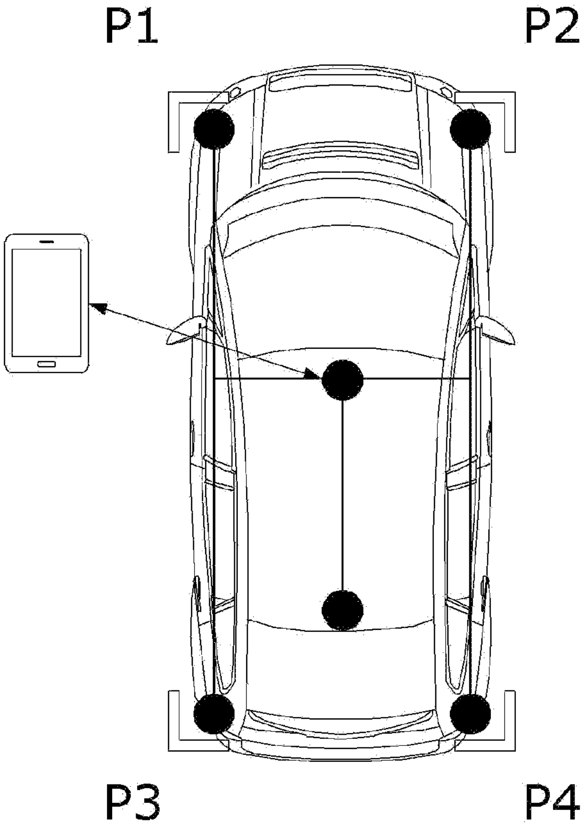

【FIG. 12b】
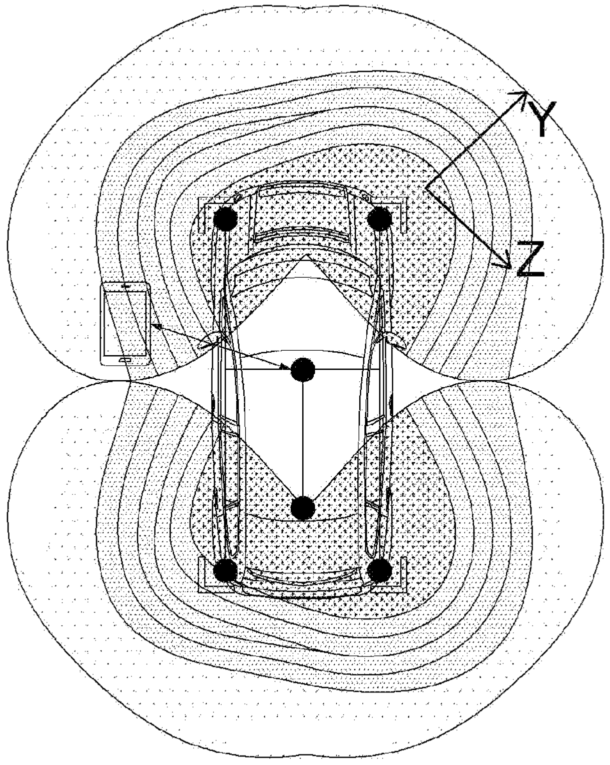

AUTOMOTIVE ARRAY ANTENNA

CROSS REFERENCE TO RELATED APPLICATIONS

This application is the National Phase of PCT International Application No. PCT/KR2020/000079, filed on Jan. 3, 2020, which claims priority under 35 U.S.C. 119(a) to Patent Application Nos. 10-2019-0000573, filed in the Republic of Korea on Jan. 3, 2019; and 10-2019-0000679, filed in the Republic of Korea on Jan. 3, 2019, all of which are hereby expressly incorporated by reference into the present application.

TECHNICAL FIELD

The present invention relates to a location determination technique, and more particularly, to an automotive array antenna configured to implement ideal signal reception performance with a simple structure.

BACKGROUND ART

In order to compensate for disadvantages of a smart key that has vulnerable security, alternative techniques have been vigorously developed by companies related to vehicles in Korea, Japan, the U.S.A., and the like. As representative alternative techniques, there are near field communication (NFC) and Bluetooth low energy (BLE) technologies. NFC has a distance inconvenience of having to bring a phone into contact with a vehicle, and a BLE vehicle location determination technique is improved therefrom one stage further. To determine a location, a location of a cell phone is calculated by detecting a phase difference between signals transmitted and received after respective antennas are spaced apart at certain intervals or more.

To add a BLE angle of arrival (AOA) function to a vehicle, it is necessary to recognize a user's phone in a full range of a vehicle and an antenna array technique is most significant therein. Here, for transmission and reception with the phone, it is necessary to evenly increase an emission range of each antenna.

FIGS. 1A to 1C are views illustrating automotive array antennas according to related arts.

Referring to FIG. 1A, a conventional automotive array antenna may include a substrate 1, a plurality of monopole antennas or dipole antennas 2, a radio frequency (RF) cable 3, and an RF connector 4. Here, since such monopole antennas or dipole antennas are expensive and three RF cables and six RF connectors are necessary when three antennas are used, costs increase.

Also, due to a linear array structure, a reflecting plate 5 which is disposed at a rear surface is additionally necessary, but it is difficult to mount the reflecting plate inside a bumper of a vehicle due to a large size thereof.

Referring to FIGS. 1B and 1C, an emission pattern of an automotive array antenna according to a related art is shown in which it may be seen that signal reception in a large range excluding a rear side of a reflecting plate is available.

However, when an array antenna is designed to increase an emission range of each antenna, the array antenna increases in size and cost, and actually, there is no space in a vehicle to place the array antenna. Until now, only ideal antennas with no substantial ability to be mass produced have been designed.

RELATED ART DOCUMENT

Korean Patent Publication No. 10-2017-0026255

DISCLOSURE

Technical Problem

The present invention is directed to providing an automotive array antenna configured to implement ideal signal reception performance with a simple structure.

Technical Solution

One aspect of the present invention provides an automotive array antenna including a first substrate, a plurality of second substrates perpendicularly disposed in one surface of the first substrate to be spaced apart at certain intervals, and a loop antenna formed on one surface of each of the plurality of second substrates. Here, the one surfaces of the plurality of second substrates are arranged in the same direction.

The loop antenna may include a radiator, a feeding line formed to extend from one end of the radiator and connected to a signal line of the first substrate, and a ground line formed to extend from the other end of the radiator and connected to a ground of the first substrate.

The radiator may be formed to have any one shape of a circular shape, an elliptical shape, and a polygonal shape.

The first substrate and the second substrate may be integrally formed.

The second substrate may be detachably coupled to the first substrate. A groove portion may be formed in one surface of the first substrate, and a protruding portion inserted into and coupled to the groove portion may be formed on one side of the second substrate.

The loop antenna may be a monopole antenna.

Another aspect of the present invention provides an automotive array antenna including a first substrate including a ground formed on one surface, a plurality of second substrates perpendicularly disposed in one surface of the first substrate to be spaced apart at certain intervals, and a loop antenna and ground plane formed on one surface of each of the plurality of second substrates. Here, the one surfaces of the plurality of second substrates are arranged in the same direction.

The one surface of the second substrate may include a first region and a second region. Here, the loop antenna may be formed in the first region, and the ground plane connected to the ground of the first substrate may be formed in the second region.

An emission area may be controllable according to an area of the ground plane.

The loop antenna may include a radiator, a feeding line formed to extend from one end of the radiator and connected to a signal line of the first substrate, and a ground line formed to extend from the other end of the radiator and connected to the ground plane.

An entire length of the radiator may be 1λ, and a ratio between a lateral length and a longitudinal length of the radiator may be formed to be 5:4.

A ratio between a length of the feeding line and a length of the ground plane may be formed to be 1:1.

Advantageous Effects

According to embodiments, signal reception in a wide range excluding a rear side may be available with a simple structure.

According to embodiments, even with a simple structure, performance equal to ideal dipole antennas may be implemented.

According to embodiments, since a low-priced substrate is used and high-priced dipole antennas, cables, and connectors are not used, material costs may be significantly reduced and miniaturization may be available.

According to embodiments, since a plurality of second substrates are perpendicularly arranged at certain intervals on one surface of a first substrate, a size of an antenna may be easily increased by adjusting the number of the second substrates.

DESCRIPTION OF DRAWINGS

FIGS. 1A to 1C are views illustrating automotive array antennas according to related arts.

FIG. 2 is a view illustrating an automotive array antenna according to a first embodiment of the present invention.

FIGS. 3A to 3D are views illustrating a shape of the automotive array antenna shown in FIG. 2.

FIGS. 4A and 4B are views illustrating a coupling relationship between a first substrate and a second substrate which are shown in FIG. 2.

FIGS. 5A and 5B are views illustrating a detailed shape of a loop antenna shown in FIG. 2.

FIGS. 6A and 6B are views illustrating an emission pattern of the automotive array antenna shown in FIG. 2.

FIG. 7 is a view illustrating an automotive array antenna according to a second embodiment of the present invention.

FIGS. 8A to 8D are views illustrating a shape of the automotive array antenna shown in FIG. 7.

FIGS. 9A and 9B are views illustrating a coupling relationship between a first substrate and a second substrate which are shown in FIG. 7.

FIGS. 10A and 10B are views illustrating a detailed shape of the second substrate shown in FIG. 7.

FIGS. 11A and 11B are views illustrating an emission pattern of the automotive array antenna shown in FIG. 7.

FIGS. 12A and 12B are views illustrating an emission pattern of an automotive array antenna mounted in a vehicle.

MODES OF THE INVENTION

Hereinafter, exemplary embodiments of the present invention will be described in detail with reference to the drawings.

However, the technical concept of the present invention is not limited to some embodiments disclosed below but can be implemented in a variety of different forms. One or more of components of the embodiments may be selectively combined or substituted with one another without departing from the scope of the technical concept of the present invention.

Also, unless defined otherwise, the terms (including technical and scientific terms) used herein may be used as meanings capable of being commonly understood by one of ordinary skill in the art. Also, terms defined in generally used dictionaries may be construed in consideration of the contextual meanings of the related art.

Also, the terms used herein are intended to describe the embodiments but not intended to restrict the present invention.

Throughout the specification, unless stated otherwise particularly, singular forms include plural forms. When at least one (or one or more) of A, B, and C is stated, this may include one or more of all combinations of A, B, and C.

Also, in describing components of the embodiments of the present invention, the terms such as first, second, A, B, (a), (b), and the like may be used.

These terms are merely for distinguishing one element from another, and the essential, order, sequence, and the like of corresponding elements are not limited by the terms.

Also, when it is stated that one element is “connected,” or “coupled” to another, the element may not only be directly connected or coupled to the other element but also be connected or coupled to the other element with another intervening element.

Also, when it is stated that an element is formed or disposed “above or below” another element, the two elements may not only come into direct contact with each other but also still another element may be formed or disposed between the two elements. Also, being “above (on) or below (beneath)” may include not only being in an upward direction but also being in a downward direction on the basis of one element.

First Embodiment

In a first embodiment, there is provided an automotive array antenna having a novel structure in which a plurality of second substrates are perpendicularly arranged at certain intervals on one surface of a first substrate and a loop antenna is formed on one surface of each of the plurality of second substrates. Particularly, the automotive array antenna according to the embodiment may be configured for short-range wireless communication technology-based angle of arrival (AOA) location determination. Here, the short-range wireless communication technology may include, for example, Bluetooth low energy (BLE) and the like.

FIG. 2 is a view illustrating the automotive array antenna according to the first embodiment of the present invention, and FIGS. 3A to 3D are views illustrating a shape of the automotive array antenna shown in FIG. 2.

Referring to FIGS. 2 and 3A to 3D, the automotive array antenna for location determination according to the first embodiment of the present invention may include a first substrate 100, a second substrate 200, and a loop antenna 300.

A plurality of such second substrates 200 may be perpendicularly arranged on one surface of the first substrate 100 while the plurality of second substrates 200 are spaced at certain intervals. The first substrate 100 may be used as a support device for linearly arranging the plurality of second substrates 200 and may also be used as a reflecting device to reflect signals, which are emitted through the loop antennas formed on the plurality of second substrates 200, forward from the one surface.

The first substrate 100 may be a printed circuit board (PCB) which is a lamination plate covered with copper coil. Accordingly, the first substrate 100 may be a reflecting device using a copper foil film which forms a basic lamination structure without needing to form an additional reflecting device on the one surface.

The second substrates 200 may be perpendicularly arranged on one surface of the first substrate 100 to be spaced apart at certain intervals. The loop antenna may be formed on one surface of the second substrate 200. In the embodiment, although it has been described as an example that three second substrates 200 are disposed on one surface of the first substrate 100, the present invention is not limited thereto and two or more second substrates 200 may be disposed on one surface of the first substrate 100 as necessary.

The second substrate 200 may be a PCB that is a lamination plate covered with copper coil. Here, the PCB may be totally applicable regardless of a lamination structure.

Here, a size of the first substrate 100 may be formed to be larger than a size of the second substrate 200. The size of the first substrate 100 may be formed to be, for example, 100 mm×60 mm in consideration of an installation space.

The loop antenna 300 may be formed on one surface of each of the plurality of second substrates 200. The loop antenna 300 may be equally formed on one surface of each of plurality of the second substrates 200 but is not limited thereto and may be differently formed as necessary.

The loop antenna 300 may be implemented to be, for example, a monopole antenna.

Here, the respective loop antennas 300 formed on one surfaces of the plurality of second substrates 200 are spaced apart at certain intervals and an interval D may satisfy Equation 1 below.

$$D=\lambda/4, \lambda=c/f \quad \text{[Equation 1]}$$

Here, λ indicates a wavelength, c indicates a speed of light ($3\times10^8$), and f indicates frequency.

FIGS. 4A and 4B are views illustrating a coupling relationship between the first substrate and the second substrate which are shown in FIG. 2.

Referring to FIG. 4A, the first substrate 100 and the second substrates 200 according to the embodiment may be detachably coupled. Here, for convenience of description, one second substrate 200 will be described. For example, one side of the second substrate 200 may be inserted into and coupled to one surface of the first substrate 100. In the embodiment, a case in which the first substrate 100 and the second substrates 200 are detachably coupled will be described as an example.

As described above, the second substrates 200 may be inserted into and coupled to the first substrate 100 through a dual inline package (DIP) type.

To this end, the first substrate 100 may include at least one groove portion 110 formed in one surface into which the second substrate 200 is inserted and coupled. Although a case in which three groove portions are formed in one surface of the first substrate 100 is shown, the number of such groove portions is not necessarily limited thereto and may vary as necessary.

The second substrate 200 may include a protruding portion 210 having one side inserted into and coupled to the at least one groove portion 110 formed in one surface of the first substrate 100. Although a case in which three protruding portions are formed in one surface of the second substrate 200 is shown, the number of such protruding portions is not limited thereto and may vary as necessary.

Here, the plurality of second substrates 200 may preferably be perpendicularly inserted into and coupled to one surface of the first substrate 100 and arranged to be spaced apart at the same intervals while at least one second substrate may be spaced apart at a different interval as necessary.

Also, the loop antennas 300 may be formed on one surfaces of the plurality of second substrates 200 while the loop antenna may be formed to be one loop and have the same shape and at least one second substrate may be formed to have a different shape as necessary.

Also, one surfaces of the plurality of second substrates 200 may be all arranged in the same direction and at least one second substrate may be disposed in a different direction.

Referring to FIG. 4B, the first substrate 100 and the second substrate 200 according to the embodiment may be integrally formed. Here, for convenience of description, one second substrate 200 will be described. For example, the first substrate 100 and the second substrate 200 may be one liquid crystal polymer (LCP) injection material through LCP injection molding.

Subsequently, the loop antenna and a circuit may be formed through a laser direct structuring (LDS) method on the first substrate 100 and the second substrate 200 which are integrally formed.

FIGS. 5A and 5B are views illustrating a detailed shape of the loop antenna shown in FIG. 2.

Referring to FIGS. 5A and 5B, the loop antenna 300 is formed on one surface of the second substrate 200 according to the embodiment of the present invention. The loop antenna 300 may include a radiator 310, a feeding line 320, and a ground line 330.

The radiator 310 may be formed to have a certain shape to emit a signal and to have, for example, any one shape of a circular shape, an elliptical shape, and a polygonal shape. Here, the radiator 310 may be formed of a conductive material, and for example, silver (Ag), palladium (Pd), platinum (Pt), copper (Cu), gold (Au), and nickel (Ni).

The radiator 310 may be formed to be one loop, the feeding line 320 may be formed to extend from one end of the loop, and the ground line 330 may be formed to extend from the other end of the loop. The feeding line 320 and the ground line 330 may be formed to be spaced apart at a certain interval to be parallel.

Here, when the second substrate is inserted into and coupled to the first substrate, the feeding line 320 may be connected to a signal line of the first substrate and the ground line 330 may be connected to a ground of the first substrate.

Also, the radiator 310 may include one loop while an entire length L of the loop may satisfy 1λ and a ratio between a lateral length Lx and a longitudinal length Ly of the loop may satisfy 5:4.

Also, a ratio between a length L_power of the feeding line and a length L_ground of a ground line may satisfy 1:1.

FIGS. 6A and 6B are views illustrating an emission pattern of the automotive array antenna shown in FIG. 2.

Referring to FIGS. 6A and 6B, in the embodiment, it may be seen through a computer simulation that a plurality of second substrates which are general low-priced substrates may be perpendicularly arranged on one surface of a first substrate of a certain size and a loop antenna may be formed on one surface of each of the plurality of second substrates so as to have performance equal to that of an existing ideal dipole antenna.

Second Embodiment

In a second embodiment, there is provided an automotive array antenna having a novel structure in which a plurality of second substrates are perpendicularly arranged at certain intervals on one surface of a first substrate in which a ground is formed and a loop antenna and a ground plane is formed on one surface of each of the plurality of second substrates.

FIG. 7 is a view illustrating an automotive array antenna according to a second embodiment of the present invention, and FIGS. 8A to 8D are views illustrating a shape of the automotive array antenna shown in FIG. 7.

Referring to FIGS. 7 and 8A to 8D, the automotive array antenna for location determination according to the second embodiment of the present invention may include a first substrate 100, a second substrate 200, a loop antenna 300, and a ground plane 400.

The first substrate 100 includes one surface and the other surface. A ground may be formed in an overall area of one surface, and a circuit may be formed on the other surface. A plurality of such second substrates 200 may be perpendicularly arranged on one surface of the first substrate 100 in which a ground is formed while the plurality of second substrates 200 are spaced at certain intervals. The first substrate 100 may be used as a support device for linearly arranging the plurality of second substrates 200 and may be used as a reflecting device to reflect signals emitted through the loop antennas formed on the plurality of second substrates 200 forward from the one surface.

The first substrate 100 may be a PCB that is a lamination plate covered with copper coil. Accordingly, the first substrate 100 may be a reflecting device using a copper foil film which forms a basic lamination structure without needing to form an additional reflecting device on the one surface.

The second substrates 200 may be perpendicularly arranged on one surface of the first substrate 100 to be spaced apart at certain intervals. The loop antenna may be formed on one surface of the second substrate 200. In the embodiment, although it has been described as an example that three second substrates 200 are disposed on one surface of the first substrate 100, the present invention is not limited thereto and two or more second substrate 200 may be disposed on one surface of the first substrate 100 as necessary.

The second substrate 200 may be a PCB that is a lamination plate covered with copper coil. Here, the PCB may be totally applicable regardless of a lamination structure.

Here, a size of the first substrate 100 may be formed to be larger than a size of the second substrate 200. The size of the first substrate 100 may be formed to be, for example, 100 mm×60 mm in consideration of an installation space.

The loop antenna 300 may be equally formed in a first region of one surface of each of the plurality of second substrates 200. The loop antenna 300 may be equally formed on one surface of each of the second substrates 200 but is not limited thereto and may be differently formed as necessary.

The loop antenna 300 may be implemented to be, for example, a monopole antenna.

The ground plane 400 may be equally formed in a second region of one surface of each of the plurality of second substrates 200. The ground plane 400 may ground the loop antenna 300 while one side thereof may be connected to the loop antenna 300 and the other side may be connected to the ground of the first substrate 100.

FIGS. 9A and 9B are views illustrating a coupling relationship between the first substrate and the second substrate which are shown in FIG. 7.

Referring to FIG. 9A, the first substrate 100 and the second substrate 200 according to the embodiment may be integrally formed. Here, for convenience of description, one second substrate 200 will be described. For example, the first substrate 100 and the second substrate 200 may be one LCP injection material through LCP injection molding.

Subsequently, the loop antenna and a circuit may be formed through an LDS method on the first substrate 100 and the second substrate 200 which are integrally formed. That is, the loop antenna may be formed on the second substrate 200, and the circuit may be formed on the first substrate 100. In the embodiment, a case in which the first substrate and the second substrate are integrally formed will be described as an example.

Referring to FIG. 9B, the first substrate 100 and the second substrate 200 according to the embodiment may be detachably coupled. Here, for convenience of description, one second substrate 200 will be described. For example, one side of the second substrate 200 may be inserted into and coupled to one surface of the first substrate 100.

As described above, the second substrates 200 may be inserted into and coupled to the first substrate 100 through a DIP type.

To this end, the first substrate 100 may include at least one groove portion 110 formed in one surface into which the second substrate 200 is inserted and coupled. In the embodiment, although a case in which three groove portions are formed in one surface of the first substrate 100 is shown, the number of such groove portions is not necessarily limited thereto and may vary as necessary.

The second substrate 200 may include a protruding portion having one side inserted into and coupled to the at least one groove portion formed in one surface of the first substrate. In the embodiment, although a case in which three protruding portions are formed in one surface of the second substrate 200 is shown, the number of such protruding portions is not limited thereto and may vary as necessary.

Here, the plurality of second substrates 200 may preferably be perpendicularly inserted into and coupled to one surface of the first substrate 100 and arranged to be spaced apart at the same intervals while at least one second substrate may be spaced apart at a different interval as necessary.

Also, the loop antennas 300 may be formed in the first regions of one surfaces of the plurality of second substrates 200 while the loop antenna may be formed to be one loop and have the same shape and at least one second substrate may be formed to have a different shape as necessary.

Also, the ground planes 400 may be formed in the second regions of the one surfaces of the plurality of second substrates 200 while an emission area may be controllable according to an area of the ground plane 400.

Also, one surfaces of the plurality of second substrates 200 may be all arranged in the same direction and at least one second substrate may be disposed in a different direction.

FIGS. 10A and 10B are views illustrating a detailed shape of the second substrate shown in FIG. 7.

Referring to FIGS. 10A and 10B, the one surface of the second substrate 200 according to the embodiment may include the first region and the second region while the loop antenna 300 may be formed in the first region and the ground plane 400 may be formed in the second region.

The loop antenna 300 may include the radiator 310, the feeding line 320, and the ground line 330.

The radiator 310 may be formed to have a certain shape to emit a signal and to have, for example, any one shape of a circular shape, an elliptical shape, and a polygonal shape. Here, the radiator 310 may be formed of a conductive material, and for example, Ag, Pd, Pt, Cu, Au, and Ni.

The radiator 310 may be formed to be one loop, the feeding line 320 may be formed to extend from one end of the loop, and the ground line 330 may be formed to extend from the other end of the loop. The feeding line 320 and the ground line 330 may be formed to be spaced apart at a certain interval to be parallel.

The feeding line 320 may be connected to a signal line of the first substrate, and the ground line 330 may be connected to the ground plane 400.

An emission area may be controllable according to an area of the ground plane 400. That is, as the area, in detail, a height h, of the ground plane 400 increases, the emission area may be further increased.

Here, the radiator 310 may include one loop while an entire length L of the loop may satisfy 1λ, and a ratio between a lateral length Lx and a longitudinal length Ly of the loop may satisfy 5:4.

Also, a ratio between a length L_power of the feeding line and a length L_ground of a ground line may satisfy 1:1.

Also, a ratio between a length L_power of the feeding line and a length L_ground_plane of a ground plane may satisfy 1:1. For example, the length L_power of the feeding line and the length L_ground_plane of the ground plane may be 10 mm.

FIGS. 11A and 11B are views illustrating an emission pattern of the automotive array antenna shown in FIG. 7.

Referring to FIGS. 11A and 11B, in the embodiment, it may be seen through a computer simulation that a plurality of second substrates which are general low-priced substrates may be perpendicularly arranged on one surface of a first substrate of a certain size and a loop antenna and a ground plane may be formed on one surface of the second substrate so as to have performance equal to that of an existing ideal dipole antenna.

FIGS. 12A and 12B are views illustrating an emission pattern of an automotive array antenna mounted in a vehicle.

Referring to FIGS. 12A and 12B, the automotive array antenna according to the first embodiment or the second embodiment of the present invention may be installed on each of both end portions P1, P2, P3, and P4 of both a front bumper and a rear bumper to perform BLE AOA location determination in the vehicle. Since doors or the like of the vehicle are formed of metal, mounting is difficult. A shark antenna is already saturated, and thus it is impossible to place several linear antennas in a band of 2.4 GHz.

When the automotive array antennas are located on the front bumper and the rear bumper of the vehicle, it is significant to allow waveforms of the antenna to be emitted outward from the vehicle. Accordingly, since the plurality of second substrates are perpendicularly arranged on one surface of the first substrate having a certain size so as to allow the first substrate to function as a reflecting plate like the embodiment, signals may be evenly emitted.

Accordingly, unlike a method of using a plurality of existing high-priced antennas and a plurality of RF cables, the antenna according to the embodiment may satisfy antenna performance only using a low-priced substrate FR-4.

Here, although a case in which antennas are installed at four locations in a vehicle is described as an example, the present invention is not limited thereto, and installation locations and number may be varied as necessary.

Although the exemplary embodiments of the present invention have been described above, it may be understood by those skilled in the art that a variety of modifications and changes may be made without departing from the concept and scope of the present invention disclosed within the range of the following claims.

The invention claimed is:

1. An automotive array antenna comprising:
- a first substrate;
- a plurality of second substrates perpendicularly disposed in one surface of the first substrate to be spaced apart at certain intervals; and
- a loop antenna formed on one surface of each of the plurality of second substrates,
- wherein a groove portion is formed in one surface of the first substrate,
- wherein a protruding portion inserted into and coupled to the groove portion is formed on one side of the second substrate, and
- wherein the loop antenna comprises:
- a radiator;
- a feeding line formed to extend from one end of the radiator and connected to a signal line of the first substrate; and
- a ground line formed to extend from the other end of the radiator and connected to a ground of the first substrate.

2. The automotive array antenna of claim 1, wherein the first substrate and the second substrate are integrally formed.

3. The automotive array antenna of claim 1, wherein the one surfaces of the plurality of second substrates are arranged in the same direction.

4. The automotive array antenna of claim 1, wherein at least one of the plurality of second substrates is arranged in the different direction.

5. The automotive array antenna of claim 1, wherein the loop antenna is equally formed on one surface of each of plurality of the second substrates.

6. The automotive array antenna of claim 1, wherein the loop antenna is differently formed on one surface of each of plurality of the second substrates.

7. An automotive array antenna comprising:
- a first substrate comprising a ground formed on an entire area of one surface;
- a plurality of second substrates perpendicularly disposed in one surface of the first substrate to be spaced apart at certain intervals; and
- a loop antenna and ground plane formed on one surface of each of the plurality of second substrates,
- wherein a groove portion is formed in one surface of the first substrate,
- wherein a protruding portion inserted into and coupled to the groove portion is formed on one side of the second substrate, and
- wherein the loop antenna comprises:
- a radiator;
- a feeding line formed to extend from one end of the radiator and connected to a signal line of the first substrate; and
- a ground line formed to extend from the other end of the radiator and connected to the ground plane.

8. The automotive array antenna of claim 7, wherein the one surface of the second substrate comprises a first region and a second region,
- wherein the loop antenna is formed in the first region, and
- wherein the ground plane connected to the ground of the first substrate is formed in the second region.

9. The automotive array antenna of claim 8, wherein an emission area is controllable according to an area of the ground plane.

10. The automotive array antenna of claim 7, wherein an entire length of the radiator is 1λ, and
- wherein a ratio between a lateral length and a longitudinal length of the radiator is formed to be 5:4.

11. The automotive array antenna of claim 7, wherein a ratio between a length of the feeding line and a length of the ground plane is formed to be 1:1.

12. The automotive array antenna of claim 7, wherein the loop antenna is equally formed on one surface of each of plurality of the second substrates.

13. The automotive array antenna of claim 7, wherein the loop antenna is differently formed on one surface of each of plurality of the second substrates.

* * * * *